US012563089B1

(12) United States Patent
Hornstein et al.

(10) Patent No.: US 12,563,089 B1
(45) Date of Patent: Feb. 24, 2026

(54) TECHNIQUES FOR CYBERSECURITY INCIDENT INVESTIGATION UTILIZING TIMELINE GENERATION BASED ON ENTITY QUERIES

(71) Applicant: Wiz, Inc., New York, NY (US)

(72) Inventors: Yehonatan Amnon Hornstein, Tel Aviv (IL); Matan Haim, Tel Aviv (IL); Ofir Brukner, Tenafly, NJ (US)

(73) Assignee: Wiz, Inc., New York, NY (US)

( * ) Notice: Subject to any disclaimer, the term of this patent is extended or adjusted under 35 U.S.C. 154(b) by 0 days.

(21) Appl. No.: 19/258,509

(22) Filed: Jul. 2, 2025

(51) Int. Cl.
*H04L 9/40* (2022.01)

(52) U.S. Cl.
CPC ...... *H04L 63/1441* (2013.01); *H04L 63/1416* (2013.01)

(58) Field of Classification Search
CPC .................. H04L 63/1441; H04L 63/1416
USPC .......................................................... 726/23
See application file for complete search history.

(56) References Cited

U.S. PATENT DOCUMENTS

| | | | |
|---|---|---|---|
| 11,949,692 B1 * | 4/2024 | Glyer .................. | H04L 63/1416 |
| 12,019,740 B2 * | 6/2024 | Trost ....................... | G06F 16/26 |
| 12,047,400 B2 * | 7/2024 | Thompson .......... | H04L 63/1433 |
| 2006/0235833 A1 * | 10/2006 | Smith ..................... | H04W 4/90 |
| 2015/0341389 A1 * | 11/2015 | Kurakami ........... | H04L 63/1425 726/1 |
| 2017/0279846 A1 * | 9/2017 | Osterweil ........... | H04L 63/1425 |
| 2020/0220885 A1 * | 7/2020 | Will ..................... | H04L 63/145 |
| 2020/0285737 A1 * | 9/2020 | Kraus ................... | G06F 21/552 |
| 2022/0334904 A1 * | 10/2022 | Chesneau .......... | G06F 11/0793 |

* cited by examiner

*Primary Examiner* — Badri Narayanan Champakesan
(74) *Attorney, Agent, or Firm* — M&B IP Analysts, LLC

(57) ABSTRACT

A system and method for entity-based timeline generation in cybersecurity investigation and remediation of detected issues thereof is presented. The method includes: receiving an incident record, wherein the incident record is generated based on a cybersecurity incident in a cloud computing environment; extracting a plurality of entities from the incident record, each entity deployed in at least the cloud computing environment; generating an entity-specific query for each of the plurality of entities extracted from the incident record; generating a timeline data structure based on at least a result of executing an entity-specific query, wherein the timeline data structure includes a user interface configured to receive a user input; and initiating a remediation action in the cloud computing environment, the remediation action selected from the user interface.

15 Claims, 3 Drawing Sheets

START

S210

GENERATING A DETECTION EVENT

S220

EXTRACTING ENTITIES FROM THE DETECTION EVENT

S230

GENERATING AN ENTITY-SPECIFIC QUERY FOR EACH
EXTRACTED ENTITY

S240

ANALYZING RESULTS OF THE ENTITY-SPECIFIC QUERIES

S250

GENERATING A TIMELINE DATA STRUCTURE

S260

INITIATING A REMEDIATION ACTION IN THE COMPUTING
ENVIRONMENT BASED ON THE TIMELINE GENERATION

END

TECHNIQUES FOR CYBERSECURITY INCIDENT INVESTIGATION UTILIZING TIMELINE GENERATION BASED ON ENTITY QUERIES

TECHNICAL FIELD

The present disclosure relates generally to automated cloud security investigation, and specifically to generation of incident timelines by querying actions of relevant entities involved in security detections for cybersecurity forensic analysis.

BACKGROUND

As organizations increasingly rely on cloud infrastructure to operate critical systems, the ability to detect, investigate, and respond to security incidents in these environments has become a top priority. Modern cloud platforms generate vast volumes of logs and telemetry data, which are essential for understanding system behavior, tracing actions, and identifying malicious activity. However, the sheer scale and complexity of this data make it exceedingly difficult for security teams to extract actionable insights in real time. Traditional security incident response systems often provide raw or semi-structured data that lacks sufficient context, requiring investigators to manually connect disparate events and interpret sequences of actions. This not only slows down response times but also increases the risk of misinterpretation or oversight.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, the method may include receiving an incident record, where the incident record is generated based on a cybersecurity incident in a cloud computing environment. The method may also include extracting a plurality of entities from the incident record, each entity deployed in at least the cloud computing environment. The method may furthermore include generating an entity-specific query for each of the plurality of entities extracted from the incident record. The method may in addition include generating a timeline data structure based on at least a result of executing an entity-specific query, where the timeline data structure includes an user interface configured to receive an user input. The method may moreover include initiating a remediation action in the cloud computing environment, the remediation action selected from the user interface. Other embodiments of this aspect include corresponding computer systems, apparatus, and computer programs recorded on one or more computer storage devices, each configured to perform the actions of the methods.

Implementations may include one or more of the following features. The method may include: detecting that an entity of the plurality of entities is an assumed role based on an event in a log of the cloud computing environment; unchaining the detecting entity to retrieve an originating entity; and generating an entity-specific query based on the originating entity. The method may include: initiating the remediation action based on the originating entity. The method may include: generating the timeline data structure further based on any one of: metadata, computing environment data, a rule which triggered detection of the incident record, or any combination thereof. The method may include: receiving the incident record, where the incident record includes a plurality of event records. The method may include: analyzing the result of each entity-specific query to generate the timeline data structure. The method where analyzing the result further may include: aggregating a plurality of results from at least a portion of the entity-specific queries. The method where analyzing the result further may include: generating a summarization based on a plurality of results from at least a portion of the entity-specific queries. The method where analyzing the result further may include: initiating cross-cloud correlation between an entity extracted from the incident record and another entity deployed in a second cloud computing environment. Implementations of the described techniques may include hardware, a method or process, or a computer tangible medium.

In one general aspect, non-transitory computer-readable medium may include one or more instructions that, when executed by one or more processors of a device, cause the device to: receive an incident record, where the incident record is generated based on a cybersecurity incident in a cloud computing environment; extract a plurality of entities from the incident record, each entity deployed in at least the cloud computing environment; generate an entity-specific query for each of the plurality of entities extracted from the incident record; generate a timeline data structure based on at least a result of executing an entity-specific query, where the timeline data structure includes an user interface configured to receive an user input; and initiate a remediation action in the cloud computing environment, the remediation action selected from the user interface. Other embodiments of this aspect include corresponding computer systems, apparatus, and computer programs recorded on one or more computer storage devices, each configured to perform the actions of the methods.

In one general aspect, system may include a processing circuitry. System may also include a memory, the memory containing instructions that, when executed by the processing circuitry, configure the system to: receive an incident record, where the incident record is generated based on a cybersecurity incident in a cloud computing environment. System may in addition extract a plurality of entities from the incident record, each entity deployed in at least the cloud computing environment. System may moreover generate an entity-specific query for each of the plurality of entities extracted from the incident record. System may also generate a timeline data structure based on at least a result of executing an entity-specific query, where the timeline data structure includes an user interface configured to receive an user input. System may furthermore initiate a remediation action in the cloud computing environment, the remediation action selected from the user interface. Other embodiments of this aspect include corresponding computer systems, apparatus, and computer programs recorded on one or more computer storage devices, each configured to perform the actions of the methods.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
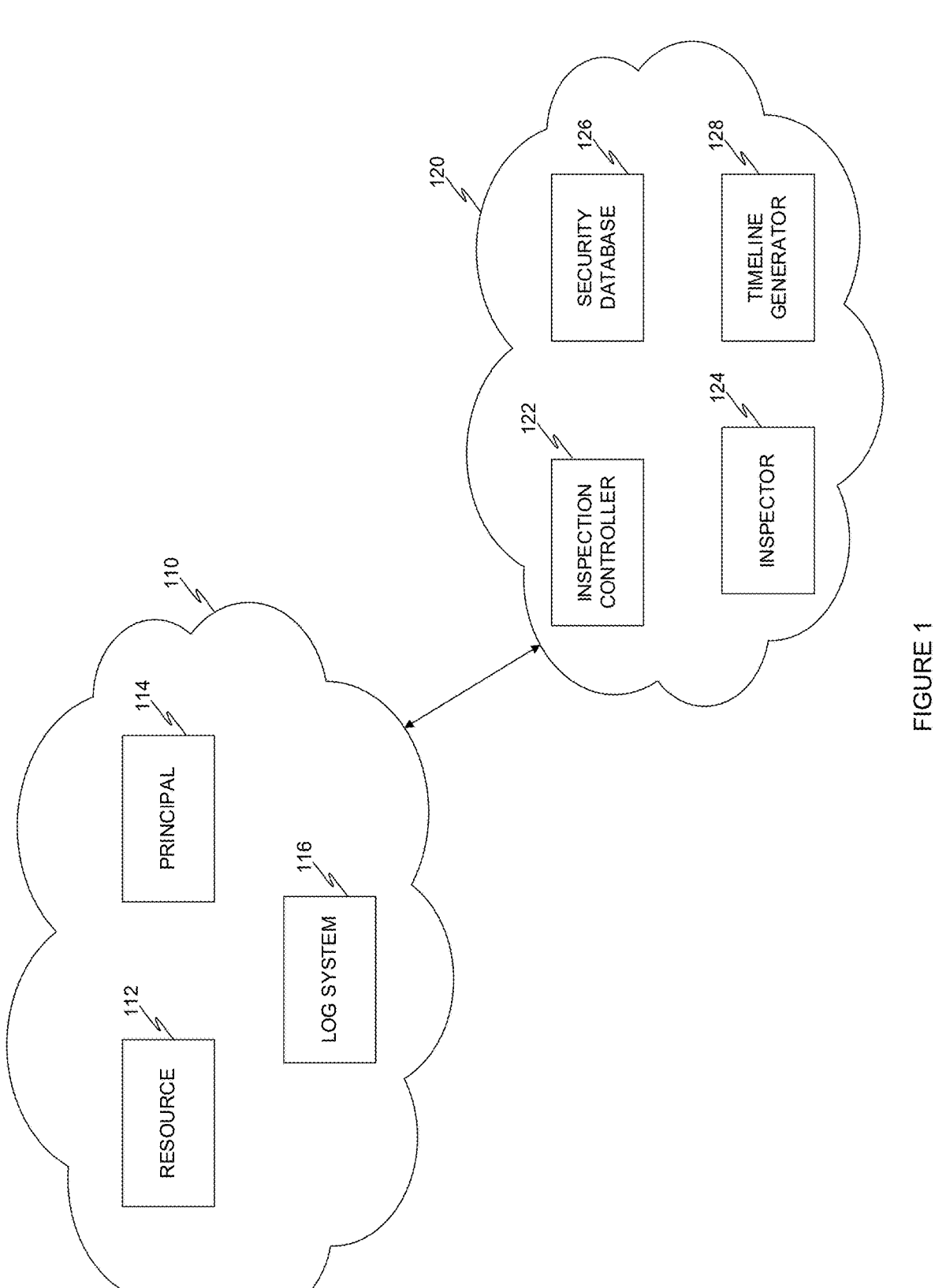
FIG. 1 is an example schematic illustration of a computing environment monitored for cybersecurity events by an inspection environment, implemented in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 is an example schematic illustration of a computing environment monitored for cybersecurity events by an inspection environment, implemented in accordance with an embodiment.

In an embodiment, a computing environment 110 includes a plurality of entities, such as resources 112, principals 114, and the like. In some embodiments, a resource 112 is a virtual machine, a software container, a serverless function, a combination thereof, and the like. In an embodiment, a resource 112 includes an application, an appliance, a software service, an exposed hardware, an exposed virtualization, and the like.

In certain embodiments, a principal 114 is a user account, a service account, a role, and the like. In an embodiment, a principal 114 is a cloud entity which is authorized to initiate actions in the computing environment 110, utilize resources 112, and the like.

In an embodiment, the computing environment 110 is a cloud computing environment implemented on a cloud computing infrastructure provided by a cloud service provider (CSP) such as Amazon® Web Services (AWS), Google® Cloud Platform (GCP), Microsoft® Azure, and the like.

In some embodiments, the computing environment 110 includes a virtual private cloud (VPC), a virtual network (VNet), a virtual private network (VPN), a combination thereof, and the like.

In certain embodiments, the computing environment includes a log system 116. According to an embodiment, a cloud log system 116 includes an ingestion pipeline, which receives logs via agents or service-native integrations. In an embodiment, the log system 116 is configured to initiate a normalization processes that structures raw data into searchable formats, such as JSON files. In some embodiments, the data is stored in time-series or indexed backends optimized for retrieval and analytics.

For example, AWS CloudWatch Logs allows applications and infrastructure components running within AWS to push logs that can be queried, filtered, and analyzed using CloudWatch Insights. Similarly, Google Cloud Logging provides real-time log ingestion and correlation with other telemetry such as metrics and traces, integrating with operations suites like Cloud Monitoring. Azure Monitor Logs, backed by Log Analytics, provides query capabilities via Kusto Query Language (KQL), supporting hybrid environments. In some deployments, these native services may feed into third-party platforms such as Splunk®, Datadog®, or Elastic Stack, which provide extended search, machine learning, and security information and event management (SIEM) features.

In an embodiment, the computing environment 110 is monitored for cybersecurity threats by an inspection environment 120. In some embodiments, the inspection environment 120 includes an inspection controller 122, an inspector 124, a security database 126, and a timeline generator 128. In an embodiment, the inspection controller 122 is configured to initiate inspection of resources 112 in the computing environment 110. In some embodiments, the inspection controller 122 is configured to provision inspector 124 workloads, initiate generation of inspectable disks, assign an inspector 124 an inspectable disk, and the like.

In an embodiment, the inspector 124 is configured to perform static analysis, detection, etc., on a resource 112, on a disk of a resource 112, on an inspectable disk generated based on a disk of a resource (e.g., by cloning the disk), a combination thereof, and the like.

In certain embodiments, the inspector 124 is configured to detect cybersecurity objects such as a binary, a library, an application, an operating system, a software service, an AI artifact, a secret, a cryptographic key, a certificate, a file, a folder, a code object, a malware signature, a hash value, a combination thereof, and the like.

In some embodiments, the inspector 124, inspection controller 122, and the like, is configured to store a detection, for example of a cybersecurity object, in a security database 126. In an embodiment, the security database 126 includes a representation of the computing environment 110. In certain embodiments, the security database 126 includes a representation of a plurality of computing environments, each deployed on a different CSP.

In an embodiment, the security database 126 includes a graph database, a tabular database, a columnar database, a combination thereof, and the like. For example, a graph database is implemented as Neo4j® where nodes in the graph represent resources, principals, enrichments, detections, cybersecurity objects, cybersecurity risks, misconfigurations, remediation actions, and the like. In an embodiment, connections between nodes (e.g., edges) represent a relationship between the entities.

For example, a node representing a misconfiguration is connected to a node representing a remediation action indicates that the misconfiguration can be corrected by initiating the remediation action. Further, a node representing a resource connected to the node representing the misconfiguration indicates that the resource includes the misconfiguration, and executing the remediation action (e.g., on the resource) will resolve the cybersecurity issue.

According to an embodiment, the inspection controller 122 is configured to detect incidents in the computing environment 110. For example, an incident is detected based on reading events from a log system 116. In some embodiments, an incident is detected based on a plurality of detected events, based on detecting events of different types, based on a frequency of events, based on a baseline behavior of a resource 112, based on a baseline behavior of a principal 114, a combination thereof, and the like.

In an embodiment, the inspection controller 122 is configured to generate an automatic response to a detection event detected by a cybersecurity monitoring system (i.e., an inspection environment). In certain embodiments, an event may involve unauthorized actions such as the deletion of cloud storage resources, unusual network exposure, privilege escalations, and the like.

According to an embodiment, in response to generating a detection, the inspection controller 122 is configured to identify all entities involved in an incident corresponding to the detection. In some embodiments, the entities include not only the direct actor (such as a user account or service account) but also any affected resources and supporting components that may have contributed to or been impacted by the incident.

In some embodiments, the inspection controller 122 is configured to resolve these detected entities into actionable identities. For example, if an activity is attributed to a generic role identifier or a transient service principal, the inspection controller 122 is configured to analyze identity relationships to trace back to the original actor.

In an embodiment, analyzing identity relationships includes traversing role assumption chains, interpreting token-based session data, a combination thereof, and the like, to determine who (principal) or what (resource) initiated a given action. The result is a clear mapping of abstract or ephemeral references to meaningful entities in the computing environment 110.

Once entities have been resolved, the inspection controller 122 is configured to initiate a recursive process of querying for surrounding activity, according to an embodiment. In some embodiments, rather than relying on static templates, it is advantageous to configure the inspection controller 122 to dynamically generate investigative questions tailored to the context of the detection, for example by generating queries for execution on the security database 126.

In some embodiments, these queries are directed to retrieve behavioral patterns, historical actions, and inter-entity relationships that may enrich the understanding of the event. The process initiated by the inspection controller 122 accounts for temporal context. For example, exploring what actions a user account performed earlier in the day, what sessions were active at the time, and whether similar interactions had occurred on the same resource. In some embodiments, the inspection controller 122 is further configured to detect whether the same entity initiated further activity after the incident, possibly indicating automated propagation or lateral movement.

In certain embodiments, the inspection controller 122 is configured to reduce the resulting data. In an embodiment, the inspection controller 122 is configured to employ mechanisms to adjust the scope of its queries based on the expected signal-to-noise ratio. For example, when querying a service account known to perform high-frequency tasks, the inspection controller 122 is configured to initially constrain the results to specific types of actions, narrow time windows, and the like.

In an embodiment, where the output of the queries remains manageable (e.g., less than a target threshold value), the inspection controller 122 will continue to expand the context of the queries incrementally. The goal is to extract only those events that contribute meaningfully to understanding the anomaly, avoiding the inclusion of operational noise.

Once the inspection controller 122 retrieves relevant data, the data is normalized, aggregated, etc. In an embodiment, the inspection controller 122 is configured to collapse repetitive or routine actions into summary blocks, preserving semantic clarity without duplicating information.

For example, when a serverless function generates multiple resources in a short span, the generated timeline reflects the aggregate behavior rather than detailing each discrete event. This enables investigators to quickly perceive patterns without manually parsing voluminous logs.

In an embodiment, the inspection controller 122 generates an incident timeline across multiple cloud environments. When identity correlations permit, the inspection controller 122 is configured to continue querying external platforms to uncover related behavior, thereby supporting investigation of coordinated or distributed attacks.

In some embodiments, the inspection controller 122 is configured to generate a structured timeline that lays out significant actions and their relationships in a coherent, temporal sequence. By focusing attention on high-value signals and revealing behavior patterns across roles and services, the provided timeline enhances the analyst's ability to understand and respond to complex security events with speed and precision.

In certain embodiments, the inspection controller 122 is further configured to generate remediation actions based on the incident. In an embodiment, the remediation actions are based on the entities which the inspection controller 122 identifier. For example, in some embodiments, where a cybersecurity incident occurs, multiple different remediation actions can be initiated, for example to mitigate damage, each on a different component of the computing environment 110.

For example, in an embodiment, where a principal 114 is detected as accessing the resource 112 in an unauthorized manner, the remediation action can be initiated on the resource 112 (e.g., blocking communication to the resource 112) or on the principal (e.g., revoking permissions from the principal 114). In an embodiment, it is advantageous to detect remediation actions which are based on the principal entity, as the principal entity is the instigator of an incident.

In some embodiments, it is advantageous to provide a plurality of remediation actions to a user, and receive via a user interface an input indicating which remediation action should be initiated in the computing environment 110, so that the user can ultimately make a decision if the remediation action should be enacted, for example, on the resource 112 or the principal 114. In such embodiments where a user input is required via a user interface, providing a clear timeline with noisy data allows for faster decision making and increased usability of the monitoring capabilities of the inspection environment 120.

In an embodiment, the inspection controller 122 is configured to provide the timeline generator 128 with incident data, log data, access to the security database 126, and the like, based on which the timeline generator 128 is configured to generate a timeline data structure, such as described in more detail below.

Figure 2:
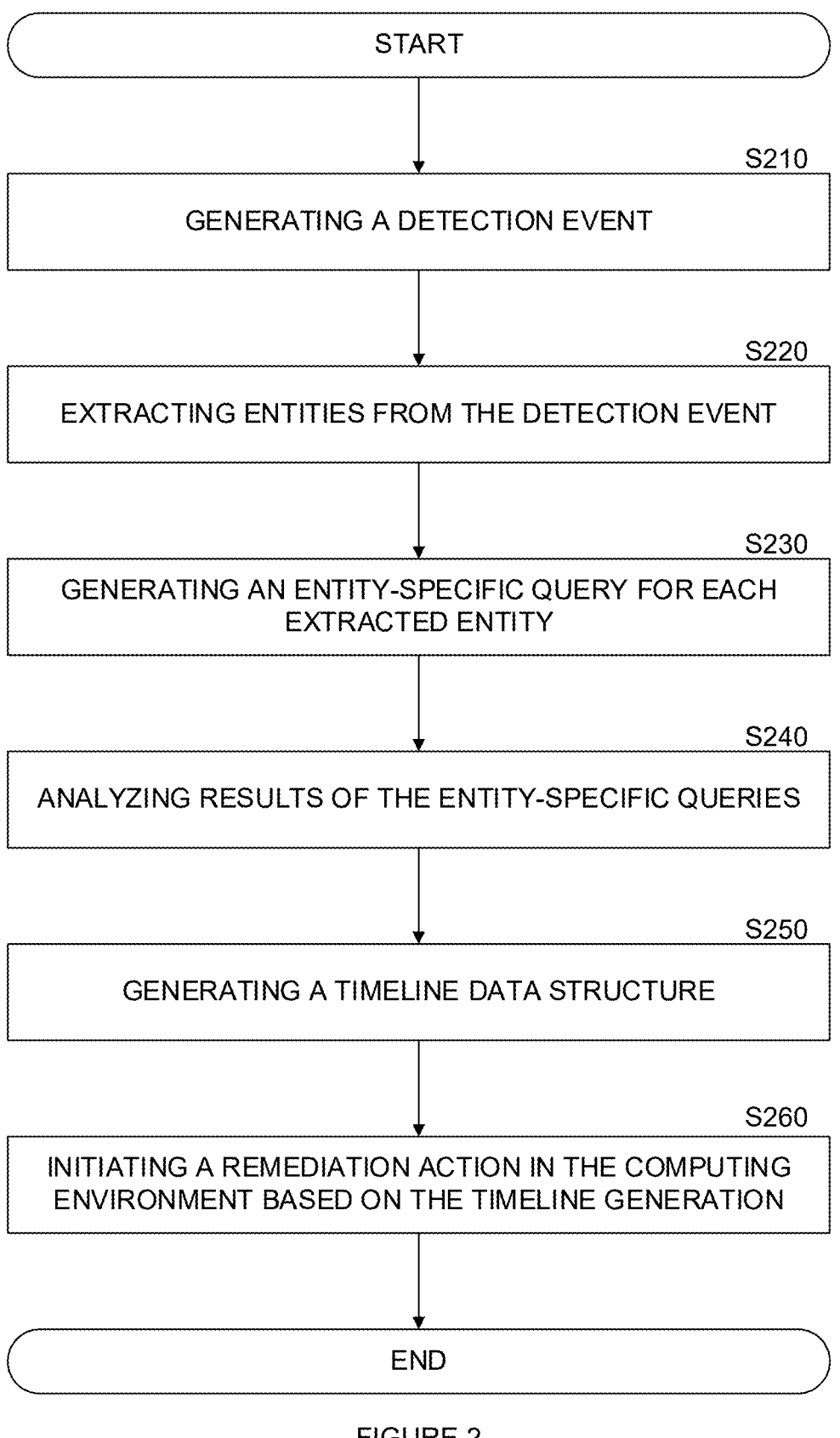
FIG. 2 is an example flowchart of a method for generating an entity-based timeline for cybersecurity investigation and remediation, implemented in accordance with an embodiment.

FIG. 2 is an example flowchart of a method for generating an entity-based timeline for cybersecurity investigation and remediation, implemented in accordance with an embodiment.

At S210, a detection event is generated. In an embodiment, the detection event is indicative of an incident. In an embodiment, an event is identified that meets predefined threat criteria. In some embodiments, a detection event includes initiating a forensic investigation workflow in a computing environment. In an embodiment, a detection triggering event originates from a variety of cloud-native telemetry sources such as audit logs, API gateways, intrusion detection systems, and the like.

In an embodiment, the event indicates a potentially anomalous action, and unauthorized action, and the like, such as a storage bucket being deleted, a virtual machine being exposed to the internet, access privileges being modified outside of regular policy boundaries.

In an embodiment, the timeline generator is configured to capture metadata associated with the event, including the timestamp, the action performed, the entity responsible for the action, the target resource, a combination thereof, and the like. In an embodiment, the metadata is processed by an inspection controller which is configured to determine the scope of the follow-up investigation (i.e., what queries to generate and how many to generate). Rather than reacting generically to all detections, the timeline generator is configured to tailor the investigative process based on the characteristics of the triggering event. For instance, if a bucket deletion is observed, the inspection controller is configured to detect that the actor, the deleted object, and any preceding write operations are critical for understanding intent and impact.

This initial detection acts as a seed, anchoring the timeline and defining the focal point for entity-based querying. It ensures that all subsequent enrichment steps, such as identity resolution and activity correlation, are grounded in a real, contextually relevant incident. By treating the triggering event not just as a symptom but as a strategic starting point, the timeline generator ensures that resources are focused on the most pertinent aspects of the investigation from the outset.

At S220, an entity is extracted from the detection event. In an embodiment, in response to a detection event being triggered, the timeline generator is configured to perform automated identification of all relevant entities. A relevant entity is, in an embodiment, an entity that initiated, was affected by, or was indirectly involved in the event records related to the incident record. In an embodiment, such an entity includes IAM roles, user accounts, service principals, virtual machines, resources (such as buckets and databases), a combination thereof, and the like.

In some embodiments, entity resolution is initiated to disambiguate abstract identifiers or temporary identifiers by tracing identity relationships. This is performed based on logs of the computing environment, based on connections between entities in a security graph, a combination thereof, and the like.

For example, if an action is logged under a service role, the timeline generator analyzes token inheritance, session initiation logs, and assume-role chains to determine the originating user or automation. In another case, when a virtual machine performs actions as a service, metadata such as instance IDs and provisioning logs help associate the behavior with the original deployment pipeline or operator. This resolution phase transforms low-level system data into semantically meaningful actors, enabling downstream queries to operate with contextual precision and ensuring that timelines reflect the true sources and targets of cloud activity.

In certain embodiments, the extracted entity is an assumed role. In some embodiments, the assumed role is resolved to an originating entity, and the method is applied to the originating entity. In an embodiment, the method is applied to any resolved entity, all resolved entities, etc. In some embodiments, resolving an entity includes traversing role assumption chains, interpreting token-based session data, a combination thereof, and the like, to determine who (principal) or what (resource) initiated a given action. The result is a clear mapping of abstract or ephemeral references to meaningful entities in the computing environment.

At S230, an entity-specific query is generated. In an embodiment, entity-specific queries are generated in response to resolving key entities. In an embodiment, the timeline generator is configured to initiate a sequence of targeted queries designed to extract contextually relevant activity from diverse logging sources.

According to an embodiment, these queries are formulated dynamically based on the nature of the detection and the entity type. For instance, following a storage deletion event, the timeline generator is configured to query all write operations performed by the user (entity) in the preceding 24 hours (prior to the incident), query all operations performed by the user in the superseding 1 hour (after the incident), request the full lifecycle history of the affected bucket, and the like. In an embodiment, querying is recursive, such that results of a current query being executed are used as an input for a future query. In an embodiment, this enables the timeline generator to pivot between entities, for example, to investigate what other actions a compromised virtual machine performed or what roles a lambda function created during execution.

To prevent overload, in some embodiments, the timeline generator is configured to regulate query depth and output through configurable granularity and redundancy filters. For example, where a service account returns thousands of daily events, the timeline generator is configured to restrict queries to higher-risk action types, tighter time intervals, a combination thereof, etc. According to an embodiment, overlapping queries are deduplicated, and high-volume responses are rate-limited or collapsed, ensuring that the timeline contains only significant, valuable events without excessive repetition or noise.

At S240, a result of a query is analyzed. In an embodiment, analyzing a query result includes aggregation of results, summarization of results, cross-cloud correlation, a combination thereof, and the like.

In an embodiment, query analysis incorporates multiple data processing steps, which are performed by the timeline generator. For example, in some embodiments, the timeline generator is configured to aggregate results to compress repetitive or structurally similar actions into singular, meaningful representations.

For example, rather than displaying each individual instance of a repeated operation in the generated timeline, the timeline generator is configured to detect temporal and semantic patterns and further configured to summarize them into higher-order timeline nodes. For example, if a function creates twenty IAM roles within a short time window, this sequence is collapsed into a single entry such as "Created 20 roles in 35 seconds," preserving both fidelity and interpretability. Summarization logic also groups related actions by resource type or actor sequence, maintaining logical continuity within the timeline.

In environments with multiple cloud providers, the timeline generator is configured to generate a timeline that expands beyond a single platform. When entity identifiers, behavioral fingerprints, and the like, overlap, the timeline generator is configured to generate and issue parallel queries against platforms like AWS, Azure, and GCP.

For example, a user triggering an alert in AWS may be linked to suspicious activity on GCP using identity-based graph traversal of a security database, e.g., to detect shared credentials. By correlating behaviors across cloud boundaries, the timeline generator exposes broader attack surfaces and enables unified investigation of distributed threats.

At S250, a timeline data structure is generated for the incident. In an embodiment, the timeline data structure is rendered as an interactive, time-ordered user interface that presents each event as a distinct, contextualized node enriched with metadata. In some embodiments, events are chronologically aligned, color-coded by entity type, by severity, etc., and grouped into collapsible sections when derived from the same actor or resource.

For example, a burst of actions by a Lambda function, such as IAM modifications and log creations, is depicted as a clustered block with the ability to drill down into individual operations. In some embodiments, the timeline data structure rendering includes hover-over tooltips which reveal execution context, such as originating IP addresses, session tokens, cloud region, and the like.

In an embodiment, a user input can be received through the user interface, which is utilized to filter views by action type, zoom into specific time intervals, trace causality chains between related nodes, and the like.

According to an embodiment, cross-cloud events are visually linked with bridging arcs, highlighting lateral movement across platforms. This visualization not only accelerates incident comprehension but also supports interactive forensics by integrating query logs and decision paths, enabling a reproducible, auditable, and highly navigable analysis workflow.

At S260, a remediation action is initiated. In an embodiment, the remediation action is selected via the user interface of the timeline. According to an embodiment, the remediation action is selected from a list of pre-populated remediation actions. In an embodiment, the list of pre-populated remediation actions is generated by the timeline generator, for example, based on the extracted entities of the incident record.

In an embodiment, a remediation action includes revoking access from a resource, revoking access to a resource, revoking a permission from a user account, suspending a user account, configuring a firewall with a network traffic rule, sandboxing a resource, generating an alert, generating an alert severity score, updating a severity score, generating a ticket in an issue tracking system, a combination thereof, and the like.

Figure 3:
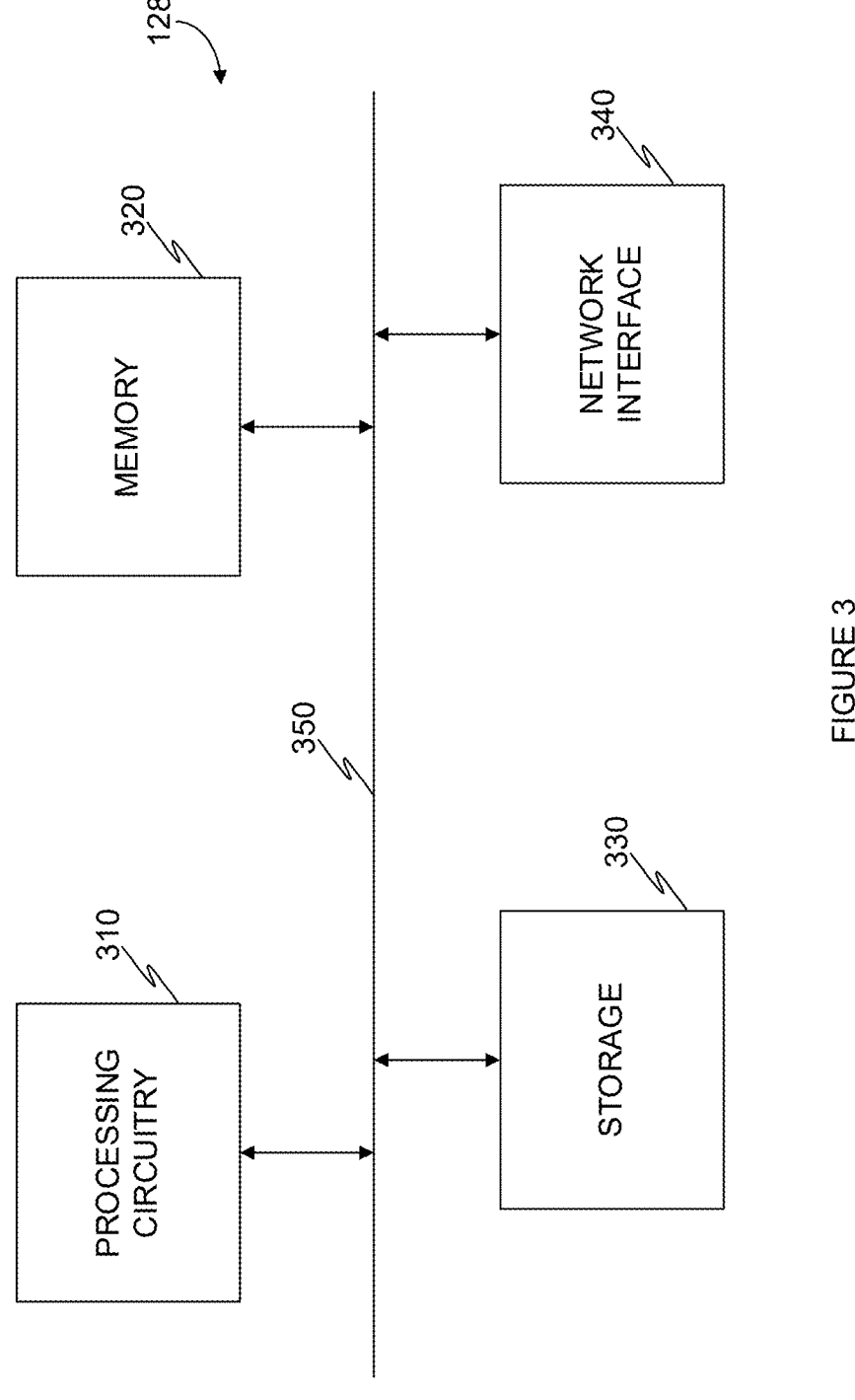
FIG. 3 is an example schematic diagram of a timeline generator according to an embodiment.

FIG. 3 is an example schematic diagram of a timeline generator 128 according to an embodiment. The timeline generator 128 includes, according to an embodiment, a processing circuitry 310 coupled to a memory 320, a storage 330, and a network interface 340. In an embodiment, the components of the timeline generator 128 are communicatively connected via a bus 350.

In certain embodiments, the processing circuitry 310 is realized as one or more hardware logic components and circuits. For example, according to an embodiment, illustrative types of hardware logic components include field programmable gate arrays (FPGAs), application-specific integrated circuits (ASICs), Application-specific standard products (ASSPs), system-on-a-chip systems (SOCs), graphics processing units (GPUs), tensor processing units (TPUs), Artificial Intelligence (AI) accelerators, general-purpose microprocessors, microcontrollers, digital signal processors (DSPs), and the like, or any other hardware logic components that are configured to perform calculations or other manipulations of information.

In an embodiment, the memory 320 is a volatile memory (e.g., random access memory, etc.), a non-volatile memory (e.g., read-only memory, flash memory, etc.), a combination thereof, and the like. In some embodiments, the memory 320 is an on-chip memory, an off-chip memory, a combination thereof, and the like. In certain embodiments, the memory 320 is a scratch-pad memory for the processing circuitry 310.

In one configuration, software for implementing one or more embodiments disclosed herein is stored in the storage 330, in the memory 320, in a combination thereof, and the like. Software shall be construed broadly to mean any type of instructions, whether referred to as software, firmware, middleware, microcode, hardware description language, or otherwise. Instructions include, according to an embodiment, code (e.g., in source code format, binary code format, executable code format, or any other suitable format of code). The instructions, when executed by the processing circuitry 310, cause the processing circuitry 310 to perform the various processes described herein, in accordance with an embodiment.

In some embodiments, the storage 330 is a magnetic storage, an optical storage, a solid-state storage, a combination thereof, and the like, and is realized, according to an embodiment, as a flash memory, as a hard-disk drive, another memory technology, various combinations thereof, or any other medium which can be used to store the desired information.

The network interface 340 is configured to provide the timeline generator 128 with communication with, for example, the security database 126, the inspector 124, the inspection controller 122, a combination thereof, and the like, according to an embodiment.

It should be understood that the embodiments described herein are not limited to the specific architecture illustrated in FIG. 3, and other architectures may be equally used without departing from the scope of the disclosed embodiments.

Furthermore, in certain embodiments the timeline generator 128, the security database 126, the inspector 124, the inspection controller 122, a combination thereof, and the like may be implemented with the architecture illustrated in FIG. 3. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer-readable medium consisting of parts, or of certain devices and/or a combination of devices. The application program may be uploaded to, and executed by, a machine comprising any suitable architecture. Preferably, the machine is implemented on a computer platform having hardware such as one or more processing units ("PUs"), a memory, and input/output interfaces. The computer platform may also include an operating system and microinstruction code. The various processes and functions described herein may be either part of the microinstruction code or part of the application program, or any combination thereof, which may be executed by a PU, whether or not such a computer or processor is explicitly shown. In addition, various other peripheral units may be connected to the computer platform, such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for entity-based timeline generation in cybersecurity investigation and remediation of detected issues thereof, comprising:
   receiving an incident record, wherein the incident record is generated based on a cybersecurity incident in a cloud computing environment;
   extracting a plurality of entities from the incident record, each entity deployed in at least the cloud computing environment;
   generating an entity-specific query for each of the plurality of entities extracted from the incident record;
   generating a timeline data structure based on analyzing at least a result of executing an entity-specific query, wherein the timeline data structure includes a user interface configured to receive a user input, and wherein analyzing at least the result includes initiating cross-cloud correlation between an entity extracted from the incident record and another entity deployed in a second cloud computing environment; and initiating a remediation action in the cloud computing environment, the remediation action selected from the user interface.

2. The method of claim 1, further comprising:
   detecting that an entity of the plurality of entities is an assumed role based on an event in a log of the cloud computing environment;
   unchaining the detected entity to retrieve an originating entity; and
   generating an entity-specific query based on the originating entity.

3. The method of claim 2, further comprising:
   initiating the remediation action based on the originating entity.

4. The method of claim 1, further comprising:
   generating the timeline data structure further based on any one of: metadata, computing environment data, a rule which triggered detection of the incident record, or any combination thereof.

5. The method of claim 1, further comprising:
   receiving the incident record, wherein the incident record includes a plurality of event records.

6. The method of claim 1, wherein analyzing the result further comprises:
   aggregating a plurality of results from at least a portion of the entity-specific queries.

7. The method of claim 1, wherein analyzing the result further comprises:
   generating a summarization based on a plurality of results from at least a portion of the entity-specific queries.

8. A non-transitory computer-readable medium storing a set of instructions for entity-based timeline generation in cybersecurity investigation and remediation of detected issues thereof, the set of instructions comprising:
   one or more instructions that, when executed by one or more processing circuitries of a device, cause the device to:
      receive an incident record, wherein the incident record is generated based on a cybersecurity incident in a cloud computing environment;
      extract a plurality of entities from the incident record, each entity deployed in at least the cloud computing environment;
      generate an entity-specific query for each of the plurality of entities extracted from the incident record;
      generate a timeline data structure based on analyzing at least a result of executing an entity-specific query, wherein the timeline data structure includes a user interface configured to receive a user input, and wherein analyzing at least the result includes initiating cross-cloud correlation between an entity extracted from the incident record and another entity deployed in a second cloud computing environment; and
      initiate a remediation action in the cloud computing environment, the remediation action selected from the user interface.

9. A system for entity-based timeline generation in cybersecurity investigation and remediation of detected issues thereof, comprising:
   a processing circuitry;
   a memory, the memory containing instructions that, when executed by the processing circuitry, configure the system to:
      receive an incident record, wherein the incident record is generated based on a cybersecurity incident in a cloud computing environment;

extract a plurality of entities from the incident record, each entity deployed in at least the cloud computing environment;

generate an entity-specific query for each of the plurality of entities extracted from the incident record;

generate a timeline data structure based on analyzing at least a result of executing an entity-specific query, wherein the timeline data structure includes a user interface configured to receive a user input, and wherein analyzing at least the result includes initiating cross-cloud correlation between an entity extracted from the incident record and another entity deployed in a second cloud computing environment; and initiate a remediation action in the cloud computing environment, the remediation action selected from the user interface.

10. The system of claim 9, wherein the memory contains further instructions which, when executed by the processing circuitry, further configure the system to:

detect that an entity of the plurality of entities is an assumed role based on an event in a log of the cloud computing environment;

unchain the detected entity to retrieve an originating entity; and generate an entity-specific query based on the originating entity.

11. The system of claim 10, wherein the memory contains further instructions which, when executed by the processing circuitry, further configure the system to:

initiate the remediation action based on the originating entity.

12. The system of claim 9, wherein the memory contains further instructions which, when executed by the processing circuitry further configure the system to:

generate the timeline data structure further based on any one of:

metadata, compute environment data, a rule which triggered detection of the incident record, or any combination thereof.

13. The system of claim 9, wherein the memory contains further instructions which, when executed by the processing circuitry further configure the system to:

receive the incident record, wherein the incident record includes a plurality of event records.

14. The system of claim 9, wherein the memory contains further instructions that, when executed by the processing circuitry for analyzing the result, further configure the system to:

aggregate a plurality of results from at least a portion of the entity-specific queries.

15. The system of claim 9, wherein the memory contains further instructions that, when executed by the processing circuitry for analyzing the result, further configure the system to:

generate a summarization based on a plurality of results from at least a portion of the entity-specific queries.

* * * * *